US012266762B2

(12) United States Patent
Tsay et al.

(10) Patent No.: US 12,266,762 B2
(45) Date of Patent: Apr. 1, 2025

(54) ELECTROLYTE ADDITIVE FOR LITHIUM SECONDARY BATTERY, ELECTROLYTE FOR LITHIUM SECONDARY BATTERY INCLUDING THE SAME, AND LITHIUM SECONDARY BATTERY

(71) Applicant: Samsung SDI Co., Ltd., Yongin-si (KR)

(72) Inventors: Olga Tsay, Yongin-si (KR); Hyejin Park, Yongin-si (KR); Myungheui Woo, Yongin-si (KR); Hyunbong Choi, Yongin-si (KR); Pavel Shatunov, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 417 days.

(21) Appl. No.: 17/627,102

(22) PCT Filed: Jul. 8, 2020

(86) PCT No.: PCT/KR2020/008916
§ 371 (c)(1),
(2) Date: Jan. 13, 2022

(87) PCT Pub. No.: WO2021/010650
PCT Pub. Date: Jan. 21, 2021

(65) Prior Publication Data
US 2022/0263131 A1     Aug. 18, 2022

(30) Foreign Application Priority Data

Jul. 16, 2019   (KR) .................. 10-2019-0085824

(51) Int. Cl.
*H01M 4/00*     (2006.01)
*H01M 4/505*    (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ......... H01M 10/0525; H01M 10/0567; H01M 10/0568; H01M 10/0569; H01M 4/505;
(Continued)

(56) References Cited

U.S. PATENT DOCUMENTS 8,936,881 B2   1/2015  Han
9,337,511 B2   5/2016  Taki et al.
(Continued)

FOREIGN PATENT DOCUMENTS

CN    105659425 A   6/2016
CN    109891654 A   6/2019
(Continued)

OTHER PUBLICATIONS

Peebles et al;. "Chemical "Pickling" or Phosphite Additives Mitigates Impedance Rise in Li Ion Batteries", Apr. 20, 2018, See the Abstract. (Year: 2018).*
(Continued)

*Primary Examiner* — Anca Eoff
*Assistant Examiner* — Monique M Wills
(74) *Attorney, Agent, or Firm* — Womble Bond Dickinson (US) LLP

(57) ABSTRACT

Provided are an electrolyte additive for lithium secondary battery including a compound represented by Formula 1 below, an electrolyte for lithium secondary battery including the same, and a lithium secondary battery including the electrolyte.

(Continued)

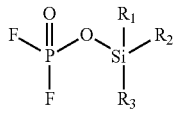

<Formula 1> wherein, in Formula 1, $R_1$ to $R_3$ are as defined in the detailed description.

12 Claims, 1 Drawing Sheet

(51) Int. Cl.
*H01M 4/525* (2010.01)
*H01M 10/0525* (2010.01)
*H01M 10/0567* (2010.01)
*H01M 10/0568* (2010.01)
*H01M 10/0569* (2010.01)
*H01M 4/02* (2006.01)

(52) U.S. Cl.
CPC ... *H01M 10/0525* (2013.01); *H01M 10/0568* (2013.01); *H01M 10/0569* (2013.01); *H01M 2004/028* (2013.01); *H01M 2300/0025* (2013.01)

(58) Field of Classification Search
CPC ......... H01M 4/525; H01M 2300/0025; H01M 2004/028; Y02E 60/10; C07F 9/14; C07F 9/65748; C07F 5/022; C07F 9/65742
See application file for complete search history.

(56) References Cited

U.S. PATENT DOCUMENTS

| | | |
|---|---|---|
| 10,547,085 B2 | 1/2020 | Roy et al. |
| 10,622,624 B2 | 4/2020 | Son et al. |
| 2008/0020276 A1 | 1/2008 | Horikawa |
| 2012/0202122 A1 | 8/2012 | Han |
| 2013/0022861 A1 | 1/2013 | Miyagi et al. |
| 2013/0337343 A1 | 12/2013 | Tokuda et al. |
| 2013/0337373 A1 | 12/2013 | Hirata et al. |
| 2015/0044551 A1 | 2/2015 | Taki et al. |
| 2015/0325879 A1 | 11/2015 | Yu et al. |
| 2016/0248121 A1 | 8/2016 | Uematsu et al. |
| 2017/0288269 A1 | 10/2017 | Moganty et al. |
| 2019/0245244 A1 | 8/2019 | Lim et al. |
| 2019/0252672 A1 | 8/2019 | Miyagi et al. |
| 2020/0251778 A1 | 8/2020 | Choi et al. |
| 2021/0066707 A1 | 3/2021 | Miyagi et al. |
| 2021/0202938 A1 | 7/2021 | Moon et al. |

FOREIGN PATENT DOCUMENTS

| | | |
|---|---|---|
| EP | 3831771 A1 | 6/2021 |
| JP | 2007-141831 A | 6/2007 |
| JP | 2007-200605 A | 8/2007 |
| JP | 2013-118168 A | 6/2013 |
| JP | 2014-82220 A | 5/2014 |
| JP | 2018-92957 A | 6/2018 |
| KR | 10-2012-0091628 A | 8/2012 |
| KR | 10-2016-0040708 A | 4/2016 |
| KR | 10-2017-0014889 A | 2/2017 |
| KR | 10-2018-0031585 A | 3/2018 |
| KR | 10-2018-0056395 A | 5/2018 |
| KR | 10-2018-0089244 A | 8/2018 |
| KR | 10-2018-0131580 A | 12/2018 |
| KR | 10-2019-0014622 A | 2/2019 |
| KR | 10-1925051 B1 | 2/2019 |
| WO | WO 2020/027415 A1 | 2/2020 |

OTHER PUBLICATIONS

Chinese Office Action, with English Translation, dated Feb. 5, 2024, issued in corresponding Chinese Patent Application No. 202080065001.8 (16 pages).
Schulz, Christoph., "Novel Conducting Salts for Rechargeable Lithium-Ion Batteries Based on the Difluorophosphato Ligand," Diss. Verlag nicht ermittelbar, 2014, 193 pages.
International Search Report dated Oct. 22, 2020, for PCT/KR2020/008916, 3 pages.
Cameron Peebles et al., Chemical "Pickling" of Phosphite Additives Mitigates Impedance Rise in Li Ion Batteries, The Journal of Physical Chemistry C, 2018, pp. 9811-9824, vol. 122, American Chemical Society.
Chinese Office Action dated Sep. 13, 2024, issued in corresponding Chinese Patent Application No. 202080065001.8 (8 pages).
R.G. Cavell et al., "Trimethylsilyl Esters of Phosphorus Acids. I. Preparation and Properties of Esters of Difluoro- and Bis(trifluoromethyl)phosphinic, -thiophosphinic, and -dithiophosphinic Acids", Inorganic Chemistry, 1972, pp. 2573-2578, vol. 11, No. 11, American Chemical Society.
Xin Qi et al., "Lifetime limit of tris(trimethylsilyl) phosphite as electrolyte additive for high voltage lithium ion batteries", RSC Advances, 2016, pp. 38342-38349, vol. 6, Royal Society of Chemistry.
Extended European Search Report issued on Jun. 21, 2024, for Corresponding EP Application No. 20841539.8, 11 Pages.

\* cited by examiner

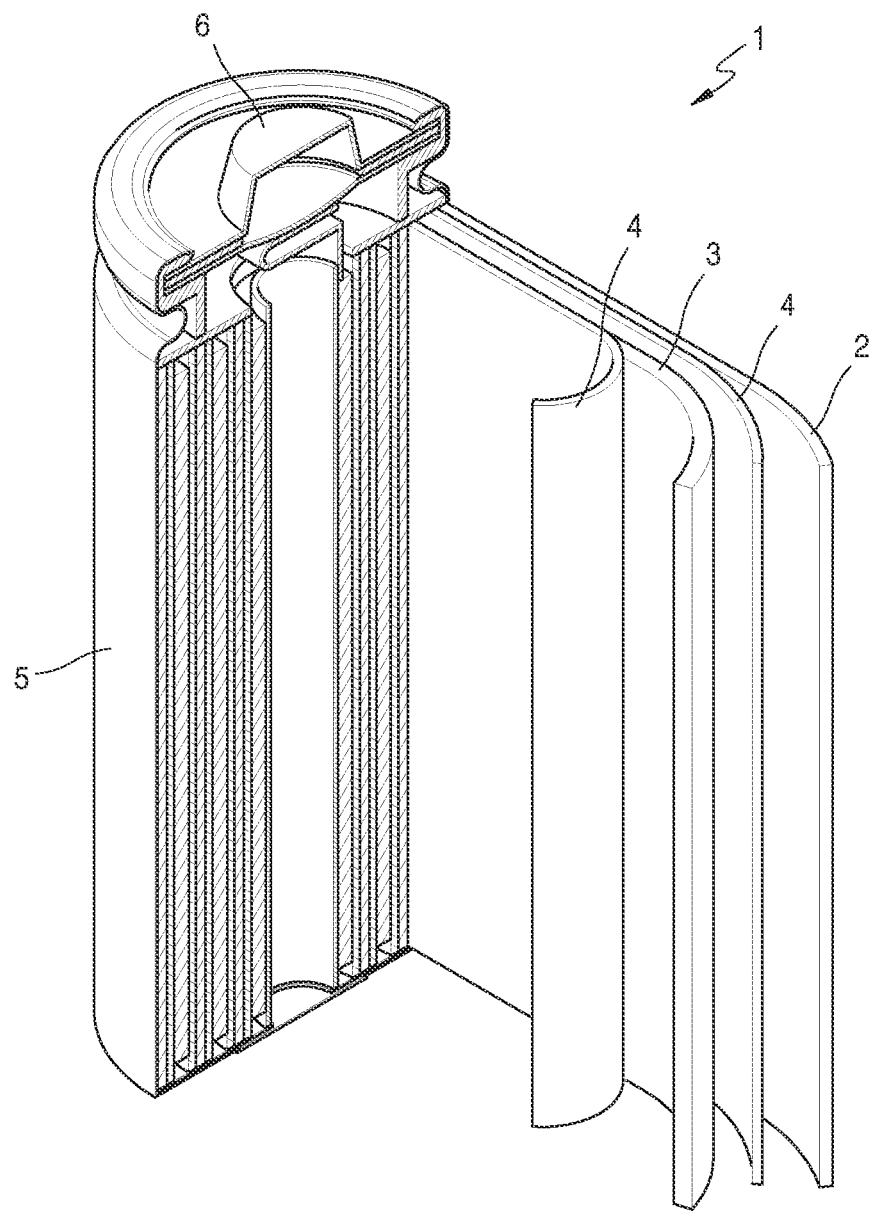

ELECTROLYTE ADDITIVE FOR LITHIUM SECONDARY BATTERY, ELECTROLYTE FOR LITHIUM SECONDARY BATTERY INCLUDING THE SAME, AND LITHIUM SECONDARY BATTERY

CROSS-REFERENCE TO RELATED APPLICATIONS

This application is a U.S. National Phase Patent Application of International Application Number PCT/KR2020/008916, filed on Jul. 8, 2020, which claims priority of Korean Patent Application Number 10-2019-0085824, filed on Jul. 16, 2019, the entire content of each of which is incorporated herein by reference.

TECHNICAL FIELD

The present disclosure relates to an electrolyte additive for lithium secondary battery, an electrolyte for lithium secondary battery including the same, and a lithium secondary battery.

BACKGROUND ART

Lithium secondary batteries are used as power sources for driving portable electronic appliances such as video cameras, mobile phones, and notebook computers. Rechargeable lithium secondary batteries have higher energy density per unit weight than known lead batteries, nickel-cadmium batteries, nickel metal hydride batteries, and nickel-zinc batteries, and may be charged at high speed.

Since lithium secondary batteries operate at a high driving voltage, an aqueous electrolyte having high reactivity with lithium cannot be used. As an electrolyte for lithium secondary batteries, an organic electrolyte is generally used. An organic electrolyte is prepared by dissolving a lithium salt in an organic solvent. It is preferable that the organic solvent is stable at high voltage, has high ionic conductivity and a high dielectric constant, and has low viscosity.

However, when an organic electrolyte containing a lithium salt is used as the electrolyte for a lithium secondary battery, lifespan characteristics and high-temperature stability of the lithium secondary battery may be deteriorated due to side reactions between the cathode/anode and the electrolyte. Therefore, there is a need for an electrolyte capable of providing a lithium secondary battery having improved lifespan characteristics and high-temperature stability.

DESCRIPTION OF EMBODIMENTS

Technical Problem

An aspect is to provide a novel electrolyte additive for a lithium secondary battery.

Another aspect is to provide an electrolyte for a lithium secondary battery including the electrolyte additive.

Still another aspect is to provide a lithium secondary battery including the electrolyte for lithium secondary battery.

Solution to Problem

According to one aspect, a lithium secondary battery electrolyte additive including the compound represented by Formula 1 is provided.

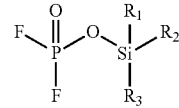

<Formula 1>

$R_1$ to $R_3$ in Formula 1 may each independently be a hydrogen atom, a substituted or unsubstituted $C_1$-$C_{30}$ alkyl group, a substituted or unsubstituted $C_2$-$C_{30}$ alkoxyalkyl group, a substituted or unsubstituted $C_4$-$C_{30}$ carbon ring, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroarylal group.

According to another aspect, there is provided an electrolyte containing:
a lithium salt;
an organic solvent; and
the additive.

According to still another aspect, there is provided a lithium secondary battery including:
a cathode including a cathode active material;
an anode including an anode active material; and
an electrolyte arranged between the cathode and the anode,
wherein the electrolyte includes the additive.

Advantageous Effects of Disclosure

When an electrolyte for a lithium secondary battery containing an electrolyte additive according to an embodiment is used, the increase of electrical resistance in a high temperature is suppressed and a lithium secondary battery having improved cycle characteristics at a high temperature can be manufactured.

BRIEF DESCRIPTION OF DRAWING

FIG. 1 is a schematic view of the lithium secondary battery according to an embodiment.

MODE OF DISCLOSURE

Hereinafter, an electrolyte additive for lithium secondary battery according to an embodiment, an electrolyte including the same, and a lithium secondary battery including the electrolyte will be described in more detail.

An electrolyte additive for lithium secondary battery according to an embodiment includes a compound represented by Formula 1.

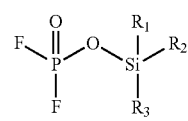

<Formula 1>

$R_1$ to $R_3$ in Formula 1 may each independently be a hydrogen atom, a substituted or unsubstituted $C_1$-$C_{30}$ alkyl group, a substituted or unsubstituted $C_2$-$C_{30}$ alkoxyalkyl group, a substituted or unsubstituted $C_4$-$C_{30}$ carbon ring, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroarylal group.

$R_1$ to $R_3$ in Formula 1 may each independently be a hydrogen atom, a $C_1$-$C_{30}$ alkyl group; a $C_1$-$C_{30}$ alkoxyalkyl group; a $C_1$-$C_{30}$ alkyl group substituted with one or more selected from the group consisting of a methyl group, an ethyl group, a propyl group, a butyl group, —F, —CL, —Br, —I, a cyano group, a hydroxyl group and a nitro group; or a $C_2$-$C_{30}$ alkoxyalkyl group, substituted with one or more selected from the group consisting of a methyl group, an ethyl group, a propyl group, a butyl group, —F, —CI, —Br, —I, a cyano group, a hydroxyl group, or a nitro group.

In Formula 1, the substituent of the substituted $C_1$-$C_{30}$ alkyl group, substituted $C_2$-$C_{30}$ alkoxyalkyl group, substituted $C_4$-$C_{30}$ carbon ring, substituted $C_6$-$C_{30}$ aryl group, substituted $C_2$-$C_{30}$ alkenyl group, substituted $C_2$-$C_{30}$ alkinyl group, or substituted $C_2$-$C_{30}$ heteroaryl group is, for example, one or more selected from the group consisting of a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group or a nitro group.

$R_1$ to $R_3$ in Formula 1 may be, for example, a $C_1$-$C_5$alkyl group, a $C_1$-$C_5$alkoxyalkyl group, a $C_1$-$C_5$ alkyl group substituted with a cyano group or a halogen atom, or a $C_1$-$C_5$ alkoxyalkyl group substituted with a cyano group or a halogen atom.

When a lithium transition metal oxide including nickel and at least one other transition metal, wherein the content of nickel is 80 mol % or more with respect to the total number of moles of the transition metals, is used as the cathode active material, a lithium secondary battery having a high power and a high capacity can be manufactured.

The lithium transition metal oxide having a high nickel content has an unstable surface structure, so gas generation due to side reactions in the charging and discharging process of the battery increases, and elution of a transition metal such as nickel is further deepened. Therefore, the lithium secondary battery using a lithium transition metal oxide having a high content of nickel as the cathode active material, may have deteriorated lifetime characteristics, and the resistance at high temperature is increased. Therefore, there is a need to improve stability at high temperatures.

In the present disclosure, the problem is solved using the electrolyte additive containing the compound of Formula 1, and lithium secondary batteries with excellent resistance suppression effect in high temperature and thereby having improved lifetime and high temperature stability can be manufactured.

The reason why the compound of Formula 1 added to an electrolyte improves the performance of a lithium secondary battery will be described in more detail below, but it is to help understand the present disclosure, and the scope of the present disclosure is not limited to the scope of the following description.

Although $LiPF_6$ is generally used as a lithium salt contained in the electrolyte, it lacks thermal stability and is easily hydrolyzed even by moisture. Likewise, the $LiPF_6$-containing electrolyte exhibits instability when exposed to moisture or high temperature. The decomposition product of $LiPF_6$ is one of the main factors that contribute to the composition of the anode interface and the change in stability. The residual moisture and/or surface hydroxyl group can react with $PF_6$ anions in the solution to generate HF and release $PF_5$. The emitted HF corrodes the cathode and gradually lowers the electrochemical performance. The Si—O bond of the compound of Formula 1 can be easily decomposed by HF. Accordingly, when the compound of Formula 1 of the present disclosure is used as an electrolyte additive, it can perform the role of removing HF from the bulk electrolyte. As such, the compound of Formula 1 can be used as a $PF_5$ scavenger, to suppress the hydrolysis reaction of $LiPF_6$ by moisture. As a result, gas generation inside the lithium secondary battery is suppressed, thereby improving the cycle life characteristics of the lithium secondary battery. In addition, due to the suppressing of the gas generation, swelling of the lithium secondary battery can be prevented.

The compound of Formula 1 strongly interacts with the transition metal ions of the cathode to completely cap and deactivate the reaction center of the cathode surface to prevent the dissolution of the transition metal and oxidation of the solvent.

The compound of Formula 1 strongly interacts with the transition metal ions of the cathode and performs a permanent capping role to deactivate the reaction center on the cathode surface, thereby preventing metal dissolution and solvent oxidation.

That is, a cathode electrolyte interphase (CEI) film having a low impedance characteristic is formed on the surface of the cathode. The CEI film prevents the electrolyte oxidation and thus inhibits the production of by-products such as gas and HF and improves cycle stability and rate performance by preventing the structure of the electrode from being destroyed. Accordingly, as the CEI film is formed, resistance at the interface between the electrolyte and the cathode is lowered to improve lithium-ion conductivity, thereby having an effect of increasing a low-temperature discharge voltage.

During the initial charging of the lithium secondary battery, the decomposition reaction of an electrolyte occurs on the surface of the anode, which is because the reduction potential of the electrolyte is relatively higher than the potential of lithium. Regarding the electrolyte decomposition reaction, an additional decomposition of the electrolyte can be prevented by forming a solid electrolyte interphase (SEI) on the surface of the electrode to suppress the movement of electrons required for a reaction between the anode and the electrolyte. Accordingly, the performance of the battery largely depends on the characteristics of the film formed on the surface of the anode. Considering this fact, it is required to form a SEI layer that is more robust and has excellent electrical properties through the introduction of an electrolyte additive capable of being decomposed before the electrolyte during a charging reaction.

Also, when the electrolyte additive containing the compound of the Formula 1 is added to the electrolyte during the initial charging, as the compound of Formula 1 includes silyl group —Si($R_4$)($R_5$)($R_6$) in the end, a SEI film with high concentration of silyl groups is formed, thereby providing a chemically stable, high polarity film. According to an embodiment, the compound of the Formula 1 is selected from compounds represented by Compounds 2 to 8:

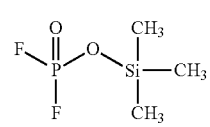

<Formula 2>

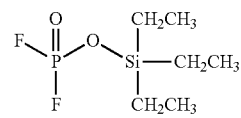

<Formula 3>

-continued

<Formula 4>

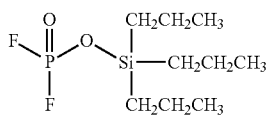

<Formula 5>

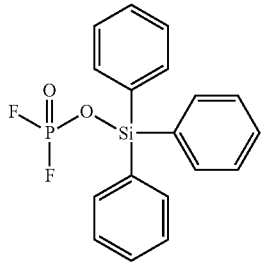

<Formula 6>

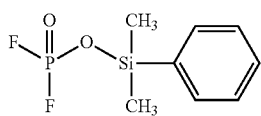

<Formula 7>

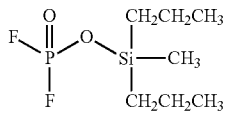

<Formula 8>

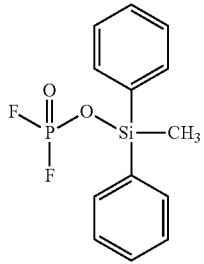

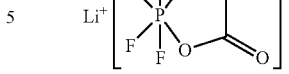
[Formula 9]

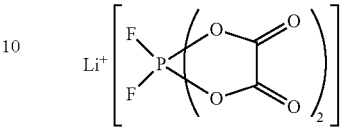
[Formula 10]

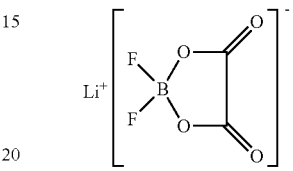
[Formula 11]

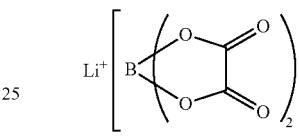
[Formula 12]

An electrolyte for lithium secondary battery according to an embodiment may include lithium salt; an organic solvent; and the additive. The content of the additive may be in the range of 0.1 wt % to 10 wt % based on the total weight of the electrolyte for lithium secondary batteries, but is not limited thereto, and may be appropriately selected within a range that does not impair battery characteristics. For example, the content of the additive may be in the range of 0.1 wt % to 5 wt %, based on the total weight of the electrolyte for lithium secondary batteries; for example, 0.1 wt % to 2 wt %, for example, 0.1 wt %, 0.5 wt %, or 2 wt %. When the content of the additive is within the above range, it is possible to manufacture a lithium secondary battery having improved high-temperature characteristics and resistance characteristics without deterioration in battery lifespan.

According to an embodiment, the lithium salt may include one or more selected from $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, and compounds represented by Formulas 10 to 12 below, but is not limited thereto, and any lithium salt may be used as long as it is used in the art.

The concentration of the lithium salt in the electrolyte is 0.01 M to 5.0 M; for example, 0.05 M to 5.0 M, for example, 0.1 M to 5.0 M, for example, 0.1 M to 2.0 M. When the concentration of the lithium salt is within the above range, further improved characteristics of the lithium secondary battery may be obtained.

The organic solvent may be at least one selected from a carbonate-based solvent, an ester-based solvent, an ether-based solvent, and a ketone-based solvent.

As the carbonate-based solvent, ethyl methyl carbonate (EMC), methyl propyl carbonate (MPC), ethyl propyl carbonate (EPC), dimethyl carbonate (DMC), diethyl carbonate (DEC), dipropyl carbonate (DPC), propylene carbonate (PC), ethylene carbonate (EC), butylene carbonate (BC), or the like may be used, as the ester-based solvent, methyl propionate, ethyl propionate, ethyl butyrate, methyl acetate, ethyl acetate, n-propyl acetate, dimethyl acetate, gamma butyrolactone, decanolide, gamma valerolactone, mevalonolactone, caprolactone, or the like may be used, as the ether-based solvent, dibutyl ether, tetraglyme, diglyme, dimethoxyethane, 2-methyltetrahydrofuran, tetrahydrofuran, or the like may be used, as the ketone-based solvent, cyclohexanone or the like may be used, and as the nitrile-based solvent, acetonitrile (AN), succinonitrile (SN), adiponitrile, or the like may be used. As other solvents, dimethyl sulfoxide, dimethylformamide, dimethylacetamide, tetrahydrofuran, and the like may be used, but are not necessarily limited thereto, and any solvent that can be used as an organic solvent in the art may be used. For example, the organic solvent may include a mixed solvent of 50 vol % to 95 vol % of chained carbonate and 5 vol % to 50 vol % of cyclic carbonate; for example, a mixed solvent of 70 vol % to 95 vol % of chained carbonate and 5 vol % to 30 vol % of cyclic carbonate. For example, the organic solvent may be a mixed solvent of three or more organic solvents.

According to an embodiment, the organic solvent may include at least one selected from the group consisting of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinyl ethylene carbonate (VEC), butylene carbonate, ethyl propionate, ethyl butyrate, dimethyl sulfoxide, dimethyl formamide, dimethyl acetamide, gamma-valerolactone, gamma-butyrolactone, and tetrahydrofuran, but is not limited thereto, and any organic solvent that can be used in the art may be used.

The electrolyte according to an embodiment includes 0.1 wt % to 10 wt % of at least one selected from compounds represented by Formulas 2 to 8, wherein the organic solvent includes a mixed solvent of 50 vol % to 95 vol % of chained carbonate and 5 vol % to 50 vol % of cyclic carbonate.

According to an embodiment, the electrolyte for lithium secondary batteries may further include an aliphatic nitrile compound. For example, the aliphatic nitrile compound may include acetonitrile (AN) or succinonitrile (SN), but it is not limited to thereto, and any with a nitrile group at the end of hydrocarbon could be used. For example, the content of the aliphatic nitrile compound may be in the range of 0.1% to 10% by weight based on the total weight of the electrolyte for a lithium secondary battery, but is not limited thereto, and may be appropriately selected within a range that does not inhibit a metal elution suppressing effect.

The electrolyte may be in a liquid or gel state.

A lithium secondary battery according to an embodiment includes a cathode including a cathode active material; an anode including an anode active material; and an electrolyte arranged between the cathode and the anode, wherein the electrolyte includes the additive.

Since the lithium secondary battery includes the electrolyte additive, an increase in the initial resistance of the lithium secondary battery is suppressed, gas generation due to side reactions is suppressed, and lifespan characteristics of the lithium secondary battery are improved.

The cathode active material includes a lithium transition metal oxide including nickel and other transition metals. In the lithium transition metal oxide including nickel and other transition metals, the content of nickel may be 60 mol % or more; for example, 75 mol % or more, for example, 80 mol % or more, for example, 85 mol % or more, for example, 90 mol % or more, with respect to the total number of moles of the transition metals.

For example, the lithium transition metal oxide may be a compound represented by following Formula 13.

$$Li_aNi_xCo_yM_zO_{2-b}A_b$$ <Formula 13>

In Formula 13, $1.0 \le a \le 1.2$, $0 \le b \le 0.2$, $0.6 \le x < 1$, $0 < y \le 0.3$, $0 < z \le 0.3$, $x+y+z=1$, M is at least one selected from the group consisting of manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and boron (B), and A is one of F, S, Cl, Br, or the combinations thereof. For example, it may be, $0.7 \le x < 1$, $0 < y \le 0.3$, $0 < z \le 0.3$; $0.8 \le x < 1$, $0 < y \le 0.3$, $0 < z \le 0.3$; $0.8 \le x < 1$, $0 < y \le 0.2$, $0 < z \le 0.2$; $0.83 \le x < 0.97$, $0 < y \le 0.15$, $0 < z \le 0.15$; or $0.85 \le x < 0.95$, $0 < y \le 0.1$, $0 < z \le 0.1$.

For example, the lithium transition metal oxide may be a compound represented by Formula 14 or 15:

$$LiNi_xCo_yMn_zO_2$$ <Formula 14>

Wherein, in Formula 14, $0.6 \le x \le 0.95$, $0 < y \le 0.2$, and $0 < z \le 0.1$, for example, $0.7 \le x \le 0.95$, $0 < y \le 0.3$, $0 < z \le 0.3$, $$LiNi_xCo_yAl_zO_2$$ <Formula 15> wherein in Formula 15, $0.6 \le x \le 0.95$, $0 < y \le 0.2$, and $0 < z \le 0.1$, for example, $0.7 \le x \le 0.95$, $0 < y \le 0.3$, $0 < z \le 0.3$, for example, $0.8 \le x \le 0.95$, $0 < y \le 0.3$, $0 < z \le 0.3$, for example, $0.82 \le x \le 0.95$, $0 < y \le 0.15$, $0 < z \le 0.15$, and for example, $0.85 \le x \le 0.95$, $0 < y \le 0.1$, $0 < z \le 0.1$.

For example, the lithium transition metal oxide may be $LiNi_{0.6}Co_{0.2}Mn_{0.2}O_2$, $LiNi_{0.88}Co_{0.08}Mn_{0.04}O_2$, $LiNi_{0.8}Co_{0.15}Mn_{0.05}O_2$, $LiNi_{0.8}Co_{0.1}Mn_{0.1}O_2$, $LiNi_{0.88}Co_{0.1}Mn_{0.02}O_2$, $LiNi_{0.8}Co_{0.15}Al_{0.05}O_2$, $LiNi_{0.8}Co_{0.1}Mn_{0.2}O_2$, or $LiNi_{0.88}Co_{0.1}Al_{0.02}O_2$.

According to an embodiment, the cathode active material includes at least one active material selected from the group consisting of Li—Ni—Co—Al (NCA), Li—Ni—Co—Mn (NCM), lithium cobalt oxide ($LiCoO_2$), lithium manganese oxide ($LiMnO_2$), lithium nickel oxide and ($LiNiO_2$), and lithium iron phosphate ($LiFePO_4$).

The anode active material may include at least one selected from a silicon-based compound, a carbon-based material, a composite of a silicon-based compound and a carbon-based compound, and a silicon oxide (SiOx, 0<x<2). The silicon-based compound may be silicon particles, silicon alloy particles, or the like.

The size of the silicon-based compound is less than 200 nm; for example, 10 nm to 150 nm. The term "size" may indicate an average particle diameter when the silicon-based compound is spherical, and may indicate an average long axis length when the silicon particles are non-spherical.

When the size of the silicon-based compound is within the above range, lifespan characteristics are excellent, and when the electrolyte according to an embodiment is used, the lifespan of the lithium secondary battery is further improved.

The carbon-based material may be crystalline carbon, amorphous carbon, or a mixture thereof. The crystalline carbon may be amorphous, plate-like, flake-like, spherical or fibrous graphite, such as natural graphite or artificial graphite, and the amorphous carbon may be soft carbon (low temperature calcined carbon) or hard carbon, mesophase pitch carbide, calcined coke, or the like.

The composite of the silicon-based compound and the carbon-based compound may be a composite having a structure in which silicon nanoparticles are arranged on the carbon-based compound, a composite in which silicon particles are included on the surface and inside of the carbon-based compound, or a composite in which silicon particles are coated with the carbon-based compound and included inside the carbon-based compound. In the composite of the silicon-based compound and the carbon-based compound, the carbon-based compound may be graphite, graphene, graphene oxide, or a combination thereof.

The composite of the silicon-based compound and the carbon-based compound may be an active material obtained by dispersing silicon nanoparticles having an average particle diameter of about 200 nm or less on the carbon-based compound particles and then performing carbon coating, or an active material in which silicon (Si) particles are present on and inside graphite. The average particle diameter of the secondary particles of the composite of the silicon-based compound and the carbon-based compound may be 5 μm to 20 μm. The average particle diameter of the silicon nanoparticles may be 5 nm or more, for example 10 nm or more, for example 20 nm or more, for example 50 nm or more, for example 70 nm or more. The average particle diameter of the silicon nanoparticles may be 200 nm or less, 150 nm or less, 100 nm or less, 50 nm or less, 20 nm or less, or 10 nm or less. For example, the average particle diameter of the silicon nanoparticles may be 100 nm to 150 nm.

The average particle diameter of the secondary particle of the composite of the silicon-based compound and the carbon-based compound may be 5 µm to 18 µm; for example, 7 µm to 15 µm, for example, 10 µm to 13 µm.

For another example of the composite of the silicon-based compound and the carbon-based compound, the porous silicon composite cluster disclosed in Korean Patent Publication No. 10-2018-0031585 and the porous silicon composite cluster structure disclosed in Korean Patent Publication No. 10-2018-0056395 may be used. Korean Patent Publication No. 10-2018-0031585 and Korean Patent Publication No. 10-2018-0056395 are incorporated as references of the present disclosure.

The composite of the silicon-based compound and the carbon-based compound according to an embodiment is a porous silicon composite cluster including a porous core containing porous silicon composite secondary particles and a shell disposed on the porous core and containing second graphene, the porous silicon composite secondary particles include an aggregate of two or more silicon composite primary particles, and the silicon composite primary particles may be a porous silicon composite cluster including silicon, silicon oxide (SiOx) (0<x<2) disposed on the silicon, and first graphene disposed on the silicon oxide.

A composite of the silicon-base d compound and the carbon-based compound according to another embodiment may be a porous silicon composite cluster structure. The porous silicon composite cluster structure includes a porous silicon composite cluster including porous silicon composite secondary particles and a second carbon flake on at least one surface of the porous silicon composite secondary particles, and a carbon-based coating film containing amorphous carbon and disposed on the porous silicon composite cluster, the porous silicon composite secondary particles include an aggregate of two or more silicon composite primary particles, the silicon composite primary particles include silicon; a silicon oxide (SiOx) (0<x<2) on at least one surface of the silicon, and a first carbon flake on at least one surface of the silicon oxide, and the silicon oxide may exist in the state of a film, a matrix, or a combination thereof.

Each of the first carbon flake and the second carbon flake may exist as a film, a particle, a matrix, or a combination thereof. In addition, each of the first carbon flake and the second carbon flake may be graphene, graphite, carbon fiber, graphene oxide, or the like.

The composite of the silicon-based compound and the carbon-based compound may be a composite having a structure in which silicon nanoparticles are disposed on the carbon-based compound, a composite in which silicon particles are included on the surface and inside the carbon-based compound, or a composite in which silicon particles are coated with the carbon-based compound and included inside the carbon-based compound. The carbon-based compound in the composite of the silicon-based compound and the carbon-based compound, may be graphite, graphene, graphene oxide, or a combination thereof.

The lithium secondary battery is not particularly limited in form, and includes a lithium-ion battery, a lithium-ion polymer battery, a lithium sulfur battery, and the like.

The lithium secondary battery may be manufactured by the following method.

First, a cathode is prepared.

For example, a cathode active material composition is prepared, in which a cathode active material, a conductive material, a binder, and a solvent are mixed. A cathode plate is prepared by directly coating a metal current collector with the cathode active material composition. Alternatively, the cathode plate may be prepared by casting the cathode active material composition onto a separate support, and then laminating the film peeled off from the support on a metal current collector. The cathode is not limited to the forms, but may have a form other than the forms.

The cathode active material, which is a lithium-containing metal oxide, may be used without limitation as long as it is generally used in the art. For example, as the lithium-containing metal oxide, at least one of composite oxides of lithium and a metal selected from cobalt, manganese, nickel, and combinations thereof may be used. Specifically, a compound represented by any one of Formulas of $Li_aA_{1-b}B^1_bD^1_2$ (where, $0.90 \leq a \leq 1.8$, and $0 \leq b \leq 0.5$ are satisfied); $Li_aE_{1-b}B^1_bO_{2-c}D^1_c$ (where, $0.90 \leq a \leq 1.8$, $0 \leq b \leq 0.5$, and $0 \leq c \leq 0.05$ are satisfied); $LiE_{2-b}B^1_bO_{4-c}D^1_c$ (where, $0 \leq b \leq 0.5$ and $0 \leq c \leq 0.05$ are satisfied); $Li_aNi_{1-b-c}Co_bB^1_cD^1_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Co_bB^1_cO_{2-\alpha}F^1_\alpha$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Co_bB^1_cO_{2-\alpha}F^1_2$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1_cD^1_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Mn_bB^1_cO_{2-\alpha}F^1_\alpha$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1_cO_{2-\alpha}F^1_2$ (where, $0.90 \leq a \leq 1.8$, $0 \leq b \leq 0.5$, $0 \leq c \leq 0.05$, and $0 < \alpha < 2$ are satisfied); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$ are satisfied); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$ are satisfied); $Li_aNiG_bO_2$ (where, $0.90 \leq a \leq 1.8$ and $0.001 \leq b \leq 0.1$ are satisfied); $Li_aCoG_bO_2$ (where, $0.90 \leq a \leq 1.8$ and $0.001 \leq b \leq 0.1$ are satisfied); $Li_aMnG_bO_2$ (where, $0.90 \leq a \leq 1.8$ and $0.001 \leq b \leq 0.1$ are satisfied); $Li_aMn_2G_bO_4$ (where, $0.90 \leq a \leq 1.8$ and $0.001 \leq b \leq 0.1$ are satisfied); $QO_2$; $QS_2$; $LiQS_2$; $V_2O_5$; $LiV_2O_5$; $LiI^1O_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$, may be used.

In the Formulas above, A is Ni, Co, Mn, or a combination thereof; $B^1$ is Al, Ni, Co, Mn, Cr, Fe, Mg, Sr, V, a rare earth element, or a combination thereof; $D^1$ is O, F, S, P, or a combination thereof; E is Co, Mn, or a combination thereof; $F^1$ is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the lithium-containing metal oxide may be $LiCoO_2$, $LiMn_xO_{2x}$ (x=1, 2), $LiNi_{1-x}Mn_xO_{2x}(0<x<1)$, $LiNi_{1-x-y}Co_xMn_yO_2$ ($0 \leq x \leq 0.5$, $0 \leq y \leq 0.5$), or $LiFePO_4$.

Also, the compound with a coating layer on the surface may be used, or a mixture of the compounds with and without a coating layer may be used. The coating layer may include coating element compounds, like the oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, any coating method using these elements may be used as long as it does not adversely affect the physical properties of the anode active material (for example, spray coating, dipping or the like). The coating methods are well understood by those skilled in the art, and a detailed description thereof will be omitted.

As the conductive material, for example, carbon black, graphite fine particles, or the like may be used, but is not limited thereto. Any conductive material may be used as long as it may be used in the art.

As the binder, a vinylidene fluoride/hexafluoropropylene copolymer, polyvinylidene fluoride (PVDF), polyacrylonitrile, polymethylmethacrylate, polytetrafluoroethylene and mixtures thereof, or a styrene butadiene rubber-based polymer may be used, but is not limited thereto. Any binder may be used as long as it is used in the art.

As the solvent, N-methylpyrrolidone, acetone, water, or the like may be used, but the present disclosure is not limited thereto. Any solvent may be used as long as it is used in the art.

The content of the anode active material, the content of the conductive material, the content of the binder, and the content of the solvent are levels commonly used in the lithium secondary battery. At least one of the conductive material, the binder, and the solvent may be omitted depending on the use and configuration of the lithium battery.

Next, an anode is prepared.

For example, an anode active material composition is prepared, in which an anode active material, a conductive material, a binder, and a solvent are mixed. An anode plate is prepared by directly coating a metal current collector with the anode active material composition. Alternatively, the anode plate may be prepared by casting the anode active material composition onto a separate support, and then laminating the film peeled off from the support on a metal current collector.

The anode active material may be, for example, at least one selected from a silicon-based compound, a carbon-based material, a silicon oxide ($SiO_x$ ($0<x<2$)), and a composite of a silicon-based compound and a carbon-based compound.

As the anode active material, all may be used as long as it is used as an anode active material for lithium secondary batteries in the art. For example, the anode active material may include at least one selected from the group consisting of lithium metal, a metal alloyable with lithium, a transition metal oxide, a non-transition metal oxide, and a carbon-based material.

As the anode active material, any anode active material may be used together as long as it is used as an anode active material for lithium secondary batteries in the art, in addition to the anode active material. For example, the metal alloyable with lithium may be Si, Sn, Al, Ge, Pb, Bi, Sb, Si—Y alloy (wherein Y is an alkali metal, an alkaline earth metal, a group 13 element, a group 14 element, a transition metal, a rare earth element, or a combination thereof, and not Si), Sn—Y alloy (wherein Y is an alkali metal, an alkaline earth metal, a group 13 element, a group 14 element, a transition metal, a rare earth element, or a combination thereof, and not Sn), or the like. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

For example, the cathode active material may be lithium titanium oxide, vanadium oxide, lithium vanadium oxide, or the like.

In the anode active material composition, the conductive material and the binder may be the same as those in the cathode active material composition.

However, in the anode active material composition, water may be used as a solvent. For example, water is used as a solvent, a carboxymethylcellulose (CMC), a styrenebutadien rubber (SBR), an acrylate polymer, a methacrylate-based polymer, and a carbon black, acetylene black, graphite may be used a s a conductive material.

The content of the anode active material, the content of the conductive material, the content of the binder, and the content of the solvent are levels commonly used in the lithium secondary battery. At least one of the conductive material, the binder, and the solvent may be omitted depending on the use and configuration of the lithium battery.

For example, an anode may be prepared by mixing 94 wt % of an anode active material, 3 wt % of the binder, and 3 wt % of the conductive material in a powder state, adding water to a solid content of about 70 wt % to make slurry, and then coating, drying and rolling the slurry.

A composite of silicon and a carbon-based compound may be used as the anode active material.

In the anode active material composition, the conductive material, the binder, and the solvent may be the same as those in the cathode active material composition.

The content of the anode active material, the content of the conductive material, the content of the binder, and the content of the solvent are levels commonly used in the lithium secondary battery. At least one of the conductive material, the binder, and the solvent may be omitted depending on the use and configuration of the lithium battery. Next, a separator to be inserted between the cathode and the anode is prepared. As the separator, any separator may be used as long as it is commonly used in a lithium battery. As the separator, a separator having low resistance to the movement of ions in the electrolyte and superior in electrolyte wettability may be used. For example, the separator may include any one selected from glass fiber, polyester, Teflon, polyethylene, polypropylene, polytetrafluoroethylene (PTFE), and combinations thereof, and it may be made in the form of nonwoven fabric or woven fabric. For example, a windable separator including polyethylene, polypropylene, or the like may be used in a lithium-ion battery, and a separator having good electrolyte impregnation ability may be used in a lithium-ion polymer battery. For example, the separator may be manufactured by the following method.

A polymer resin, a filler, and a solvent are mixed to prepare a separator composition. The separator composition may be directly applied on an electrode and dried to form a separator. Alternatively, the separator composition may be cast on a support and dried, and the separation film peeled off from the support is laminated on the electrode to form a separator.

The polymer resin used in the manufacture of the separator is not limited, and any material may be used as long as it may be used in a binder of an electrode plate. For example, as the polymer resin, a vinylidene fluoride/hexafluoropropylene copolymer, polyvinylidene fluoride (PVDF), polyacrylonitrile, polymethyl methacrylate, or a mixture thereof may be used.

The loading level of the cathode active material composition is set according to the loading level of the anode active material composition. The loading level of the anode active material composition is 12 mg/cm$^2$ or more; for example 15 mg/cm$^2$ or more according to the capacity per g of the anode active material composition. Electrode density may be at least 1.5 g/cc, for example 1.6 g/cc or more. As a design that emphasizes energy density, a design with a density of more than 1.65 g/cc and less than 1.9 g/cc is preferred.

Next, the electrolyte is prepared.

According to an embodiment, the electrolyte may further include a non-aqueous electrolyte, an organic solid electrolyte, and an inorganic solid electrolyte in addition to the electrolyte.

As the organic solid electrolyte, for example, polyethylene derivatives, polyethylene oxide derivatives, polypropylene oxide derivatives, phosphoric acid ester polymers, polyester sulfide, polyvinyl alcohols, polyvinylidene fluoride, or the like may be used.

As the inorganic solid electrolyte, for example, $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, or the like may be used.

As shown in FIG. 1, the lithium secondary battery 1 includes a cathode 3, an anode 2, and a separator 4. The cathode 3, the anode 2 and the separator 4 are wound or folded and accommodated in a battery case 5. Then, the electrolyte according to an embodiment of the present disclosure is injected into the battery case 5, and the battery case 5 is sealed with a cap assembly 6 to complete the manufacture of the lithium secondary battery 1. The battery case may have a cylindrical shape, a rectangular shape, or a thin film shape. For example, the lithium secondary battery may be a large thin-film battery. The lithium secondary battery may be a lithium-ion battery.

The separator may be located between the cathode and the anode to form a battery structure. The battery structure is laminated as a bi-cell structure and then impregnated with an electrolyte, and the resulting product is accommodated in a pouch and sealed to complete a lithium-ion polymer battery.

Further, the plurality of battery structures are laminated to form a battery pack, and this battery pack may be used in all appliances requiring high capacity and high power. For example, the battery pack may be used in notebooks, smart phones, electric vehicles, and the like.

In the lithium secondary battery according to an embodiment, a DCIR increase rate is significantly reduced, thereby exhibiting excellent battery characteristics, compared to a lithium secondary battery employing a general nickel-rich lithium-nickel composite oxide as an cathode active material.

The operating voltage of the lithium secondary battery to which the cathode, the anode, and the electrolyte are applied has a lower limit of 2.5 V to 2.8 V and an upper limit of 4.1 V or more, for example, 4.1 V to 4.45 V.

The lithium secondary battery may be used in power tools driven by an electric motor; electric vehicles (EVs) including hybrid electric vehicles (HEVs), plug-in hybrid electric vehicles (PHEVs); electric two-wheeled vehicles such as electric bicycles (E-bikes) and electric scooters (E-scooters); electric golf carts; power storage systems; and the like, but the present disclosure is not limited thereto.

The term "alkyl group" as used herein refers to a branched or unbranched aliphatic hydrocarbon group. In an embodiment, the alkyl group may be substituted or unsubstituted. The alkyl group includes, but are not limited to, a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group, each of which may be optionally substituted in other embodiments. In another embodiment, the alkyl group may have 1 to 6 carbon atoms. For instance, alkyl groups with 1 to 6 carbon atoms may include, but are not limited to, a methyl group, an ethyl group, a propyl group, an isopropyl group, a butyl group, an isobutyl group, a sec-butyl group, a pentyl group, a 3-pentyl group, and a hexyl group.

At least one hydrogen atom of the alkyl group may be substituted with a halogen atom, a $C_1$-$C_{20}$ alkyl group (for example, $CF_3$, $CHF_2$, $CH_2F$, $CCl_3$, or the like) substituted with a halogen atom, a $C_1$-$C_{20}$ alkoxy group, a $C_2$-$C_{20}$ alkoxyalkyl group, a hydroxyl group, a nitro group, a cyano group, an amino group, an amidino group, hydrazine, hydrazone, a carboxyl group or its salt, a sulfonyl group, a sulfamoyl group, a sulfonic acid group or its salt, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_7$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, or a $C_6$-$C_{20}$ heteroaryloxyalkyl group.

The term "alkenyl group" as used herein is a hydrocarbon group of 2 to 20 carbon atoms having at least one carbon-carbon double bond and includes, but is not limited to, an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, and a cyclopentenyl group. In an embodiment, the alkenyl group may be substituted or unsubstituted. In an embodiment, the alkenyl group may have 2 to 40 carbon atoms.

The term "alkynyl group" as used herein means a hydrocarbon group of 2 to 20 carbon atoms having at least one carbon-carbon triple bond, and includes, but is not limited to, an ethynyl group, a 1-propynyl group, a 1-butynyl group, and a 2-butynyl group. In an embodiment, the alkynyl group may be substituted or unsubstituted. In an embodiment, the alkynyl group may have 2 to 40 carbon atoms.

A substituent used herein is derived from an unsubstituted parent group, wherein at least one hydrogen atom is substituted with another atom or functional group. Unless otherwise specified, when a functional group is considered to be "substituted," it means that the functional group is substituted with at least one substituent independently selected from the group consisting of a $C_1$-$C_{20}$ alkyl group, a $C_2$-$C_{20}$ alkenyl group, a $C_2$-$C_{20}$ alkynyl group, a $C_1$-$C_{20}$ alkoxy group, halogen, a cyano group, a hydroxy group, and a nitro group. When a functional group is described as being "optionally substituted", the functional group may be substituted with the aforementioned substituent.

The term "halogen" includes fluorine, bromine, chlorine, and iodine.

The "alkoxy" refers to "alkyl-O—", where alkyl is as defined above. Examples of the alkoxy group may include a methoxy group, an ethoxy group, a 2-propoxy group, a butoxy group, a t-butoxy group, and pentyloxy group, hexyloxy group. A least one hydrogen atom of the alkoxy group may be substituted with the same substituent as in the case of the alkyl group.

"Heteroaryl" refers to a monocyclic or bicyclic organic group which contains one or more heteroatoms selected from N, O, P or S, and the remaining ring atoms of which are carbon. The heteroaryl group may include, for example, 1 to 5 heteroatoms, and may include 5 to 10 ring members. The S or N may be oxidized to have various oxidation states.

Examples of heteroaryl may include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl group, 1,2,3-thiadiazolyl, 1,2,4-thiadiazolyl, 1,2,5-thiadiazolyl, 1, 3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazine-2-yl, pyrazin-4-yl, pyrazin-5-yl, 2-pyrimidin-2-yl, 4-pyrimidin-2-yl, and 5-pyrimidin-2-yl.

The term "heteroaryl" includes instances in which a heteroaromatic ring is optionally fused to one or more of aryl, cycloaliphatic, or heterocycle.

The term "carbocyclic" refers to a saturated or partially unsaturated non-aromatic monocyclic, bicyclic or tricyclic hydrocarbon group.

Examples of the monocyclic hydrocarbon group include cyclopentyl, cyclopentenyl, cyclohexyl, and cyclohexenyl.

Examples of the bicyclic hydrocarbon group may include bornyl, decahydronaphthyl, bicyclo [2.1.1] hexyl, bicyclo [2.1.1] heptyl (bicyclo) [2.2.1]heptyl), bicyclo[2.2.1]heptenyl, and bicyclo[2.2.2]octyl.

An example of the tricyclic hydrocarbon group may include adamantyl.

One or more hydrogen atoms in the carbon ring may be substituted with the same substituents as in the case of the alkyl group.

The present disclosure will be described in more detail through the following Examples and Comparative Examples. However, these Examples are provided to illustrate the present disclosure, and the scope of the present disclosure is not limited thereto.

Pre-Preparation Example 1: Preparation of Compound of Formula 2

Difluorophosphoric acid (0.075 mol) was slowly added to trimethyl (phenyl) silane (0.075 mol) at 0° C.

The reaction mixture was stirred in 25° C. (Room Temperature) for 1.5 hours. Through evaporation process, the product $(H_3C)_3Si(O_2PF_2)$ was obtained in a colorless liquid state (9.15 g, 70%).

$^1$H NMR (400 MHz, CDCl3) δ=0.34 (s).
$^{19}$F NMR (376.17 MHz, CDCl3) δ=−82.3 (d, $^1J_{FP}$=985 Hz).
$^{31}$P NMR (161.83 MHz, CDCl3) δ=−28.7 (t, $^1J_{FP}$=985 Hz).

Pre-Preparation Example 2: Preparation of Compound of Formula 3

Triethylsilyl Chloride (0.2 mol) was added to a neat difluorophosphoric acid (0.2 mol) using a syringe. The reaction mixture was heat-treated at 65° C. for 6 hours to terminate gas generation, potassium phosphate (20.0 mmol, 0.1 eq, 4.25 g) was added to the reaction mixture, and subsequent evaporation process was carried out. Through evaporation process, the product was obtained in a colorless liquid state (45%).

$^1$H NMR (400 MHz, CDCl3) δ=0.34 (t), 0.28 (q).
$^{19}$F NMR (376.17 MHz, CDCl3) δ=−83.3 (d, $^1J_{FP}$=985 Hz).
$^{31}$P NMR (161.83 MHz, CDCl3) δ=−27.7 (t, $^1J_{FP}$=985 Hz).

Preparation Example 1: Preparation of Electrolyte 1.5 M of $LiPF_6$ and vinylene carbonate were added to a mixed solvent having a volume ratio of ethylene carbonate (EC), ethylmethyl carbonate (EMC), and dimethyl carbonate (DMC) of 2:4:4, and then the compound of Formula 2 obtained according to Pre-preparation Example 1 was added thereto to prepare an electrolyte for lithium secondary batteries. The content of the compound of the Formula 2 is about 1.0 wt % based on the total weight of the electrolyte, and the content of the vinylene carbonate is about 1.5 wt % based on the total weight of the electrolyte.

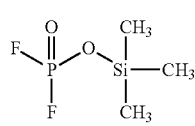

<Formula 2>

Preparation Example 2: Preparation of Electrolyte

An electrolyte for a lithium secondary battery was prepared in the same manner as in Preparation Example 1, except that the compound of Formula 3 obtained in accordance with Pre-preparation Example 2 was used instead of the compound of Formula 2.

<Formula 3>

Preparation Example 3: Preparation of Electrolyte

An electrolyte for a lithium secondary battery was prepared in the same manner as in Preparation Example 1, except that the content of the compound of Formula 2 was changed to about 0.5 wt % based on the total weight of the electrolyte.

Preparation Example 4: Preparation of Electrolyte

An electrolyte for lithium secondary battery was prepared in the same manner as in Preparation Example 1, except that the content of the compound of Formula 2 was changed to about 0.1 wt % based on the total weight of the electrolyte.

Preparation Example 5: Preparation of Electrolyte

An electrolyte for lithium secondary battery was prepared in the same manner as in Preparation Example 1, except that the content of the compound of Formula 2 was changed to about 2 wt % based on the total weight of the electrolyte.

Preparation Example 6: Preparation of Electrolyte

An electrolyte for lithium secondary battery was prepared in the same manner as in Preparation Example 1, except that the compound of Formula 5 was used instead of the compound of Formula 2.

<Formula 5>

Preparation Example 7: Preparation of Electrolyte

An electrolyte for lithium secondary battery was prepared in the same manner as in Preparation Example 1, except that the compound of Formula 7 below was used instead of the compound of Formula 2.

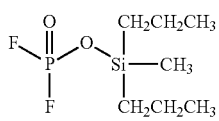

<Formula 7>

Comparative Preparation Example 1: Preparation of Electrolyte

An electrolyte for lithium secondary battery was prepared in the same manner as in Preparation Example 1, except that the compound of Formula 2 was not added.

Comparative Preparation Example 2: Preparation of Electrolyte

An electrolyte for lithium secondary battery was prepared in the same manner as in Preparation Example 1, except that compound A was used in place of compound of Formula 2.

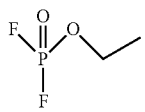

Compound A

Comparative Preparation Example 3: Preparation of Electrolyte

An electrolyte for lithium secondary battery was prepared in the same manner as in Preparation Example 1, except that compound B was used in place of compound of Formula 2.

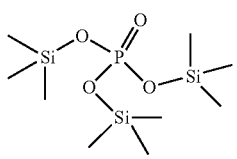

Compound B

Example 1: Manufacture of Lithium Secondary Battery 87 w % of graphite, 11 wt % of a silicon-carbon-based compound composite, 1 wt % of styrene-butadiene rubber (SBR) (ZEON), and 1.0 wt % of carboxymethyl cellulose (CMC, NIPPON A&L) were mixed, introduced in distilled water, and then stirred for 60 minutes using a mechanical stirrer to prepare an anode active material slurry. The slurry was applied to a thickness of about 60 µm onto a copper current collector having a thickness of 10 µm using a doctor blade, dried in a hot air dryer at 100° C. for 0.5 hours, dried once again under conditions of vacuum and 120° C. for 4 hours, and then roll-pressed to prepare an anode.

For the silicon-carbon-based compound composite, carbon-silicon composite containing carbon-coated silicone particles (manufactured by BTR) was used.

97 wt % of $LiNi_{0.8}Co_{0.1}Al_{0.1}O_2$(NCA), 0.5 wt % of artificial graphite (SFG6, Timcal) powder as a conductive material, 0.8 wt % of carbon black (Ketjenblack, ECP), 0.2 wt % of modified acrylonitrile rubber (BM-720H, Zeon corporation), 1.2 wt % of polyvinylidene fluoride (PVdF, S6020, Solvay), 0.3 wt % of polyvinylidene fluoride (PVdF, S5130, Solvay) were mixed into N-methyl-2-pyrrolidone, and stirred for 30 minutes using a mechanical stirrer to prepare a cathode active substance. The slurry was applied to a thickness of about 60 µm onto an aluminum current collector having a thickness of 20 µm using a doctor blade, dried in a hot air dryer at 100° C. for 0.5 hours, dried once again under conditions of vacuum and 120° C. for 4 hours, and then roll-pressed to prepare a cathode.

A cylindrical lithium secondary battery was manufactured by using a polyethylene separator of a thickness of 14 µm in which ceramic was coated on the cathode as a separator and using the electrolyte prepared in Preparation Example 1 as an electrolyte.

Examples 2-7: Manufacture of Lithium Secondary Battery

Lithium secondary batteries were manufactured in the same manner as in Example 1, except the electrolytes prepared according to Preparation Examples 2 to 7 were used respectively instead of the electrolyte prepared in Preparation Example 1.

Comparative Examples 1 to 3: Manufacture of Lithium Secondary Batteries

Lithium secondary batteries were manufactured in the same manner as in Example 1, except the electrolytes prepared according to Comparative Preparation Examples 1 to 3 were used respectively instead of the electrolyte prepared in Preparation Example 1.

Evaluation Example 1: Test of Initial Direct Current Resistance (DC-IR) at Room Temperature (25° C.) and Direct Current Resistance Increase Rate after Storage at High Temperature The lithium secondary batteries prepared in Examples 1 to 7 and Comparative Examples 1 to 3 were tested under the condition of 1 C/10 sec discharge (SOC 100) at 25° C., and the direct current initial resistance (DCIR) was measured with a ΔV/ΔI (change in voltage/change in current) value before the lithium secondary batteries were stored in an oven at a high temperature of 60° C. Some of the results are shown in Table 1 and FIG. 2 below. Then, after measuring the initial direct current resistance (DCIR), the resistance were measured again after storage for 30 days at a high temperature (60° C.), and a DDIR increase rate (%) was calculated according to Equation 1 below.

DCIR increase rate=[DCIR(30 d.)−DCIR(0 d.)]/DCIR(0 d.)×100%  [Equation 1]

In Equation 1, DCIR(30 d.) is the DCIR after 30 days, DCIR (0 d.) is the DCIR just before the storage.

The DCIR increase rate measurement results are shown in Table 1 below.

TABLE 1

|  | Initial direct current resistance (DCIR)(Ω) | Storage at 60° C. for 30 days | |
|---|---|---|---|
|  |  | DCIR(Ω) | DCIR increase rate (%) |
| Example 1 | 3.25 | 3.83 | 17.85 |
| Example 2 | 3.26 | 3.85 | 18.10 |
| Example 3 | 3.26 | 3.87 | 18.71 |
| Example 4 | 3.30 | 3.93 | 19.10 |
| Example 5 | 3.27 | 3.88 | 18.65 |
| Example 6 | 3.26 | 3.89 | 19.3 |
| Example 7 | 3.31 | 3.96 | 19.63 |
| Comparative Example 1 | 2.94 | 4.61 | 56.80 |
| Comparative Example 2 | 3.14 | 4.37 | 39.17 |
| Comparative Example 3 | 3.41 | 4.62 | 35.5 |

As shown in Table 1, when the lithium secondary batteries of Examples 1 and 2 were stored for a long time at a high temperature, their high-temperature resistance increase rates were remarkably lower than those of the lithium secondary batteries of Comparative Example 1 not containing the compound of Formula 2 or 3, and Comparative Examples 2 and 3 containing other additives. This is because the compound of Formula 2 or the compound of Formula 3 effectively scavenges $PF_5$ and thereby stabilizes a lithium salt and forms a stable coating on the surface of the cathode to effectively suppress the side reaction of the cathode and the electrolyte. In addition, as shown in Table 1, when stored for a long time at a high temperature, the lithium secondary batteries of Examples 3 to 7 have lower high-temperature resistance increase rates compared to the lithium secondary battery of Comparative Examples 1 to 3, like the lithium secondary battery of Example 1.

Evaluation Example 2: Charge/Discharge Characteristics Test at Room Temperature (25° C.)

The lithium secondary batteries manufactured in Examples 1 to 7 and Comparative Examples 1 to 3 were charged at the constant current of 0.1 C rate at 25° C. until the voltage reached 4.3 V (vs. Li), and then, while 4.3 V was maintained in a constant-current mode, cut-off was performed at the current of 0.05 C rate. Subsequently, discharging was performed at the constant current of 0.1 C rate until the voltage reached 2.8 V (vs. Li) (formation process, 1st cycle).

The lithium secondary battery that went through the 1st cycle of the formation operation, was charged at the constant current of 0.2 C rate until the voltage reached 4.3 V (vs. Li), and then, while 4.3 V was maintained in a constant-voltage mode, cut-off was performed at the current of 0.05 C rate. Subsequently, discharging was performed at the constant current of 0.2 C rate until the voltage reached 2.8 V (vs. Li) (formation process, 2nd cycle).

The lithium secondary battery that went through the formation process, was charged at the constant current of 0.5 C rate until the voltage reached 4.3 V (vs. Li), and then, while 4.3 V was maintained in a constant voltage mode, cut off was performed at the current of 0.05 C rate. Subsequently, discharging was performed at the constant current of 1.0 C rate until the voltage reached 2.8 V (vs. Li). This charge/discharge cycle was repeated 200 times.

In all the charge/discharge cycles, there was a rest period of 10 minutes after one charge/discharge cycle.

Part of the charge/discharge test results are shown in Table 2 below. The capacity retention ratio at the $200^{th}$ cycle is defined as Formula 2, and the results of capacity retention ratio test is shown in Table 2 below.

Capacity retention ratio=[discharge capacity in $200^{th}$ cycle/discharge capacity in $1^{st}$ cycle]×100      <Formula 2>

TABLE 2

| Class. | Capacity retention ratio (%) |
|---|---|
| Example 1 | 81 |
| Example 2 | 80 |
| Example 3 | 78 |
| Example 4 | 78 |
| Example 5 | 80 |
| Example 6 | 80 |
| Example 7 | 78 |
| Comparative Example 1 | 70 |
| Comparative Example 2 | 70 |
| Comparative Example 3 | 76 |

As the result of the charge/discharge characteristic test, as shown in Table 2, the lithium secondary batteries of Examples 1 to 7 showed improved capacity retention ratio compared with the lithium secondary batteries of Comparative Examples 1 to 3.

Evaluation Example 3: DC Resistance Increase Rate after Storage at High Temperature The lithium secondary batteries prepared in Examples 1 to 7 and Comparative Examples 1 to 3 were tested under the condition of 1 C/10 sec discharge (SOC 100) at 25° C., and the initial direct current resistance (DCIR) was measured with a ΔV/ΔI (change in voltage/change in current) value before the lithium secondary batteries were stored in an oven at a high temperature of 45° C. The initial DC resistance (DCIR) was measured, and the results are shown in Table 3 below.

As described above, after measuring the initial DC resistance of lithium secondary batteries of Examples 1 and 2 and Comparative Examples 1 to 3, 200 cycles of charge/discharge cycle were performed at 45° C. as described in Evaluation Example 2 above. After 200 cycles of charge/discharge were performed, the resistance was measured to calculate the DCIR increase rate (%) according to Formula 3.

DCIR increase rate=DCIR(200 cycles of charge/discharge)/DCIR(0 d.)×100%      [Formula 3]

In Equation 1, DCIR (200 cycles of charge/discharge) is DCIR after 200 cycles of charge/discharge at 45° C., DCIR(0 d.) is DCIR just before 200 cycles of charge/discharge.

The DCIR increase rate measurement results are shown in Table 3 below.

TABLE 3

|  |  | 45° C., 200 cycles | |
|---|---|---|---|
| Class. | Initial DC Resistance (DCIR)(Ω) | DCIR(Ω) | DCIR increase rate (%) |
| Example 1 | 3.23 | 3.71 | 114.86 |
| Example 2 | 3.25 | 3.72 | 114.46 |
| Example 3 | 3.27 | 3.76 | 114.98 |
| Example 4 | 3.30 | 3.80 | 115.15 |

TABLE 3-continued

| Class. | Initial DC Resistance (DCIR)(Ω) | 45° C., 200 cycles | |
|---|---|---|---|
| | | DCIR(Ω) | DCIR increase rate (%) |
| Example 5 | 3.28 | 3.77 | 114.94 |
| Example 6 | 3.27 | 3.76 | 114.98 |
| Example 7 | 3.32 | 3.82 | 115.06 |
| Comparative Example 1 | 3.00 | 4.81 | 160.33 |
| Comparative Example 2 | 3.20 | 4.78 | 149.37 |
| Comparative Example 3 | 3.40 | 4.67 | 137.35 |

As shown in Table 3, when 200 charge/discharge cycles were performed at a high temperature (45° C.) on the lithium secondary batteries of Examples 1 and 2, they showed markedly low high-temperature resistance increase rate compared to Comparative Example 1 that does not contain the compound of Formula 2 or 3, or Comparative Examples 2 and 3 that contain other additives. In addition, as shown in Table 3, like the lithium secondary battery of Example 1, the lithium secondary batteries of Examples 3 to 7 showed low high-temperature resistance increase rate after 200 cycles at a high temperature compared to the lithium secondary batteries of Comparative Examples 1 to 3.

The invention claimed is:

1. An electrolyte additive for lithium secondary battery, comprising: a compound represented by Formula 1 below:

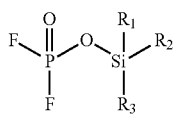

<Formula 1> wherein, $R_1$ to $R_3$ in Formula 1 are each independently a hydrogen atom, a substituted or unsubstituted $C_1$-$C_{30}$ alkyl group, a substituted or unsubstituted $C_2$-$C_{30}$ alkoxyalkyl group, a substituted or unsubstituted $C_4$-$C_{30}$ carbon ring, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroarylal group, and wherein at least one of $R_1$, $R_2$, or $R_3$ is a different substituent other than a methyl group.

2. The electrolyte additive of claim 1, wherein, $R_1$ to $R_3$ in Formula 1 are each independently a hydrogen atom, a $C_1$-$C_{30}$ alkyl group; a $C_2$-$C_{30}$ alkoxyalkyl group; a $C_1$-$C_{30}$ alkyl group substituted with one or more selected from the group consisting of a methyl group, an ethyl group, a propyl group, a butyl group, —F, —Cl, —Br, —I, a cyano group, a hydroxy group and a nitro group; or a $C_2$-$C_{30}$ alkoxyalkyl group substituted with one or more selected from the group consisting of a methyl group, an ethyl group, a propyl group, a butyl group, —F, —Cl, —Br, —I, a cyano group, a hydroxyl group, and a nitro group, and wherein at least one of $R_1$, $R_2$, or $R_3$ is a different substituent other than a methyl group.

3. The electrolyte additive of claim 1, wherein, $R_1$ to $R_3$ in Formula 1 are each independently a hydrogen atom, a $C_1$-$C_5$ alkyl group; a $C_2$-$C_5$ alkoxyalkyl group; a $C_1$-$C_5$ alkyl group substituted with one or more selected from the group consisting of a methyl group, an ethyl group, a propyl group, a butyl group, —F, —Cl, —Br, —I, a cyano group, a hydroxy group and a nitro group; or a $C_2$-$C_{30}$ alkoxyalkyl group substituted with one or more selected from the group consisting of a methyl group, an ethyl group, a propyl group, a butyl group, —F, —Cl, —Br, —I, a cyano group, a hydroxyl group, and a nitro group, and wherein at least one of $R_1$, $R_2$, or $R_3$ is a different substituent other than a methyl group.

4. The electrolyte additive of claim 1, wherein, $R_1$ to $R_3$ in Formula 1 are each independently a $C_1$-$C_5$ alkyl group, a $C_2$-$C_5$ alkoxyalkyl group, a $C_1$-$C_5$ alkyl group substituted with a cyano group or a halogen atom, or a $C_2$-$C_5$ alkoxyalkyl group substituted with a cyano group or a halogen atom, and wherein at least one of $R_1$, $R_2$, or $R_3$ is a different substituent other than a methyl group.

5. The electrolyte additive of claim 1, wherein, the compound represented by Formula 1 is selected from compounds represented by Formulas 3 to 8:

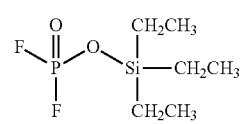

<Formula 3>

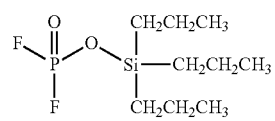

<Formula 4>

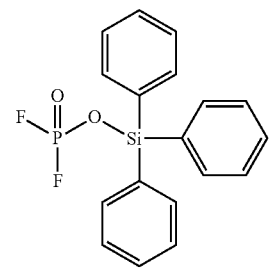

<Formula 5>

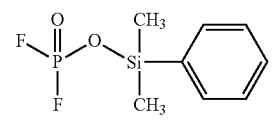

<Formula 6>

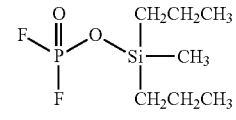

<Formula 7>

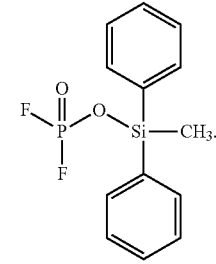

<Formula 8>

6. An electrolyte for lithium secondary batteries, comprising:
a lithium salt;
a non-aqueous organic solvent; and
the additive according to claim 1.

7. The electrolyte of claim 6, wherein,
a content of the additive is in a range of 0.1 wt % to 10 wt % based on a total weight of the electrolyte.

8. The electrolyte of claim 6, wherein,
a content of the additive is in a range of 0.1 wt % to 5 wt % based on a total weight of the electrolyte.

9. The electrolyte of claim 6, wherein,
the lithium salt is at least one selected from $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, and compounds represented by Formulas 9 to 12 below:

[Formula 9]

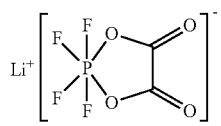

[Formula 10]

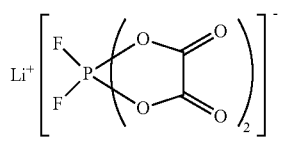

[Formula 11]

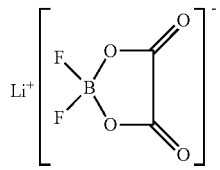

[Formula 12]

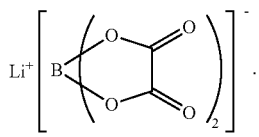

10. The electrolyte of claim 6, wherein,
the organic solvent includes at least one selected from the group consisting of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinylethylene carbonate (VEC), butylene carbonate, ethyl propionate, ethyl butyrate, dimethyl sulfoxide, dimethylformamide, dimethylacetamide, gamma-valerolactone, gamma-butyrolactone, and tetrahydrofuran.

11. A lithium secondary battery comprising:
a cathode including a cathode active material;
an anode including an anode active material; and
an electrolyte arranged between the cathode and the anode,
wherein the electrolyte includes the additive of claim 1.

12. The lithium secondary battery of claim 11, wherein the cathode includes a compound represented by Formula 13:

$$Li_aNi_xCo_yM_zO_{2-b}A_b$$ <Formula 13> wherein, in Formula 13, $1.0 \leq a \leq 1.2$, $0 \leq b \leq 0.2$, $0.6 \leq x < 1$, $0 < y \leq 0.3$, $0 < z \leq 0.3$, $x+y+z=1$, and M is at least one selected from the group consisting of manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and boron (B), and A is one of F, S, Cl, Br, or a combination thereof.

* * * * *

UNITED STATES PATENT AND TRADEMARK OFFICE
CERTIFICATE OF CORRECTION

PATENT NO. : 12,266,762 B2
APPLICATION NO. : 17/627102
DATED : April 1, 2025
INVENTOR(S) : Olga Tsay et al.

Page 1 of 1

It is certified that error appears in the above-identified patent and that said Letters Patent is hereby corrected as shown below:

In the Claims

In Column 21, Line 48, in Claim 1, delete "heteroarylal" and insert -- heteroaryl --.

Signed and Sealed this
Twenty-second Day of July, 2025

Coke Morgan Stewart
*Acting Director of the United States Patent and Trademark Office*